United States Patent [19]

Tanaka

[11] Patent Number: 5,541,723

[45] Date of Patent: Jul. 30, 1996

[54] DISTANCE MEASURING DEVICE

[75] Inventor: Yoshito Tanaka, Sakai, Japan

[73] Assignee: Minolta Camera Kabushiki Kaisha, Osaka, Japan

[21] Appl. No.: 261,860

[22] Filed: Jun. 17, 1994

[30] Foreign Application Priority Data

Jun. 21, 1993 [JP] Japan .................. 5-149398

[51] Int. Cl.$^6$ ............................ G01C 3/00
[52] U.S. Cl. .................. 356/3.01; 356/3.03; 356/3.06
[58] Field of Search ................... 356/3.01, 3.03, 356/3.06

[56] References Cited

U.S. PATENT DOCUMENTS

| 5,191,384 | 3/1993 | Nakanishi et al. | 356/1 |
| 5,221,955 | 6/1993 | Inoue | 356/1 |

FOREIGN PATENT DOCUMENTS 5-71956 3/1993 Japan.

*Primary Examiner*—Mark Hellner
*Attorney, Agent, or Firm*—Willian Brinks Hofer Gilson & Lione

[57] ABSTRACT

A distance measuring device according to the present invention includes a light projector, a controller, and a light receiver. The light projector projects light toward an object to be measured, and the controller controls the light projector to carry out a first light projection to emit a first light at a predetermined angle with a first light distribution, and subsequently to carry out a second light projection to emit a second light at the predetermined angle with a second light distribution which is different from the first light distribution. The light receiver receives the first and second light emitted by the light projector and reflected from the object, and produces light reception signals, and a circuit arrangement calculates a distance to the object by means of the light reception signals.

With the invention, by projecting multiple distance measuring beams of light having different luminous intensity distributions toward a certain distance measurement point of the object at different times and calculating the object distance based on the output from the light receiver means which is obtained as a result of the projections, correct object distance information can be obtained even if vignetting exists.

17 Claims, 14 Drawing Sheets

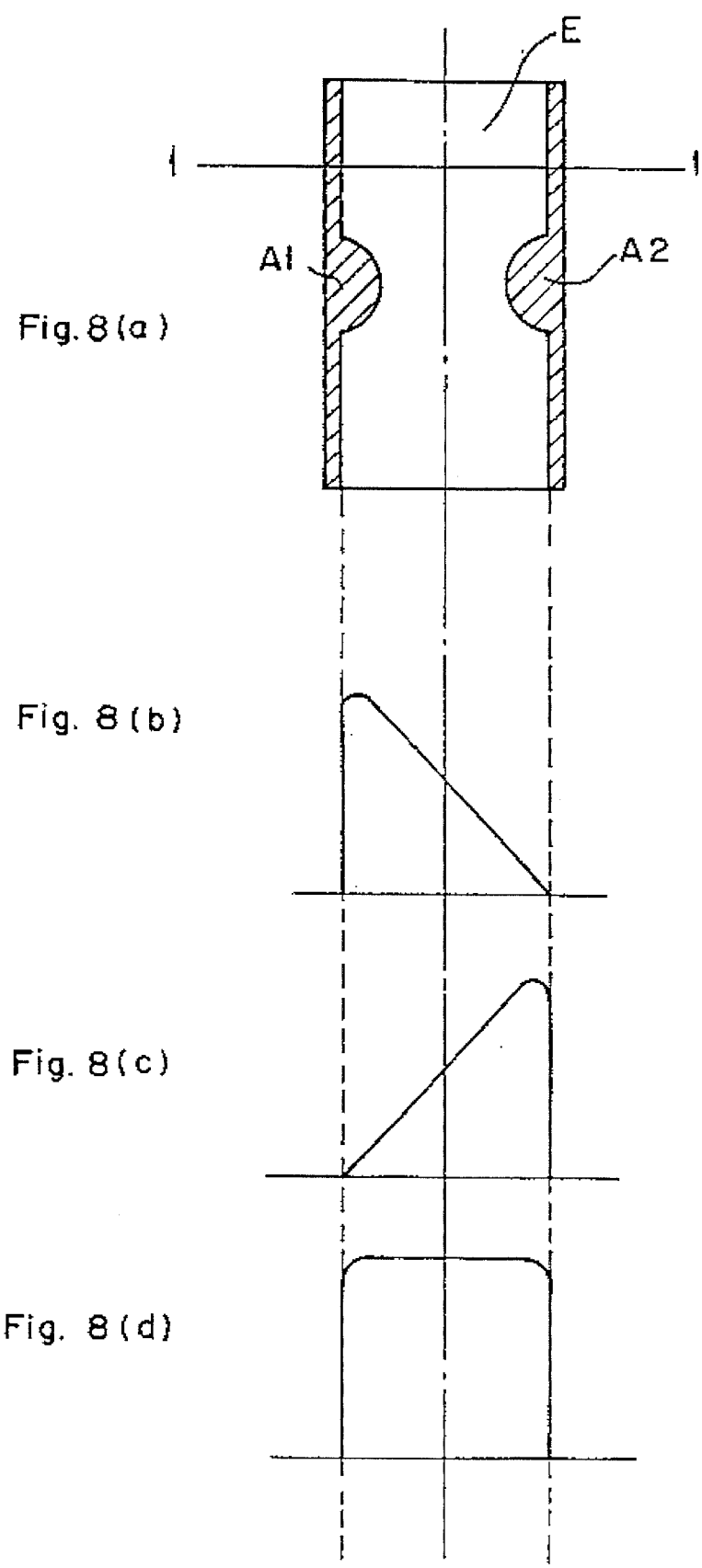

1

DISTANCE MEASURING DEVICE

BACKGROUND OF THE INVENTION

1. Field of the Invention

The present invention relates generally to a distance measuring device for cameras; and, more particularly, to a distance measuring device based on the so-called active method, in which a light receiving element receives reflections of beams of light emitted toward an object from a light emitting element, and the object distance is measured based on the conversion of the reflected beams of light into electrical signals by the light receiving element.

2. Description of the Prior Art

Conventionally, distance measurement in a camera involves a distance measurement system in which a beam of light is emitted toward an object from a light emitting element, such as a light emitting diode (LED); and the light reflected from the object is received as a spot of light by a light receiving element, such as a position sensitive device (PSD). The object distance is measured based on the position of the spot of the reflected light, applying the principles of trigonometric surveying.

However, in conventional distance measuring systems used in cameras, when a part of the light emitted from the light emitting element does not impinge upon the main object; but, instead, continues past the main object to the background (such a phenomenon is called "vignetting"), the location of the center point of the reflected light on the PSD moves out of place, resulting in an erroneous distance measurement and thus a blurred picture.

FIG. 1 illustrates the operation of the distance measurement function of an active auto-focus process based on the trigonometric survey method. As shown in FIG. 1, light emitted from a light source 3 is caused to converge into a beam by light projecting lens 4 which shares optical axis L1 with light source 3, and is projected onto an object 5. The light reflected from object 5 passes through a light receiving lens 2 having an optical axis L2 parallel to optical axis L1 of light projecting lens 4, and forms an image at position P on light receiving surface 10 of PSD 1 positioned at the focal length f of light receiving lens 2 such that its center O coincides with optical axis L2 and its surface 10 is perpendicular to optical axis L2.

When the reflected light strikes surface 10 of PSD 1, electric currents flow via two electrodes A and B positioned on opposite ends of PSD 1 according to the intensity of the reflected light. These currents are designated in FIG. 1 as ia and ib and are defined by the formulae $$ia = Rb/(Ra+Rb)(IO) \quad (1)$$

$$ib = Ra/(Ra+Rb)(IO) \quad (2)$$

In the formulae, ia and ib are the electric currents which flow via the electrodes A and B, respectively, the electric current generated according to the intensity of the reflected light is IO and the resistances between point P and electrodes A and B are Ra and Rb, respectively. As also shown in FIG. 1, the distance between center O of surface 10 and point P is x and the effective resistance length of PSD 1 is m.

As is known in the art, the non-resistance distribution over the length m is uniform on the PSD 1. Therefore, the resistances Ra and Rb are proportional to the distances between point P and electrodes A and B, respectively, and can be expressed using distance x and length m. In other words, the above formulae (1) and (2) can be written as follows.

$$ia = (m/2 + x)/(m)(IO) \quad (3)$$

$$ib = (m/2 - x)/(m)(IO) \quad (4)$$

In the above formulae (3) and (4), since IO is an unknown which is proportional to the intensity of the reflected light which forms an image at point P, the unknown x cannot be obtained using only one of the above formulae (3) and (4). Therefore, in order to eliminate the influence of the above IO, the ratio K between ia and (ia+ib) is generally sought using the relation of IO=ia+ib. That is, $$\begin{aligned} K &= ia/(ia+ib) \\ &= (1/2 + x/m)(IO)/IO \\ &= 1/2 + x/m \end{aligned} \quad (5)$$

is obtained. As a result, information which contains only the unknown x indicating the position of point P can be obtained. In other words, by measuring ia and ib, x can be obtained.

If the distance between light projecting lens 4 and the object 5 is D, the focal length of light receiving lens 2 is f (usually the PSD is located in the vicinity of the focal point of the light receiving lens), the distance between optical axis L1 of light projecting lens 4 and optical axis L2 of light receiving lens 2 (i.e., the base-length) is BL and the object whose reflected light forms an image at center O of surface 10 of PSD 1 is an object at infinity; the following formula is obtained via the trigonometric survey method.

$$BL/D = x/f \quad (6)$$

Therefore, D is obtained as $$D = (BL)(f)/x \quad (7)$$

Therefore, if the denominator x in the above formula (7) can be obtained by obtaining the above-mentioned ratio K, the distance D between light projecting lens 4 and object 5 can be calculated.

The vignetting phenomenon will now be explained. Specifically, in the above explanation, it was assumed that the position where the reflected light from the object forms an image was at point P. In truth, however, image formation takes place not only on point P but across surface 10 of PSD 1. Therefore, image formation point P should be deemed to be the location of the center point corresponding to the light acceptance intensity distribution of the reflected light.

If the light source's width of tip in the direction of the baseline is W, the focal length of the light projecting lens is f1 and the focal length of the light receiving lens is f2; the width of light source image WPSD formed on surface 10 of PSD 1 is expressed as $$WPSD = (W)(f2/f1) \quad (8)$$

As shown in FIG. 2, when the quantity of received light is symmetrical across the center line of WPSD, the location of the center point, namely image formation point P, is determined to be the center of WPSD.

When the vignetting phenomenon takes place, however, as shown in FIG. 3, reflected light is received on the PSD surface, as shown in FIG. 4. Incidentally, the same reference numbers as in FIG. 1 are used in FIG. 3 for corresponding elements. In FIG. 3, an image 3' of light source 3 is projected onto an object 5. The shaded area of the image refers to the portion which is correctly projected onto the object and the reflected light of this portion is received on the surface 10 of PSD 1. However, because the remaining portion of the image other than that indicated by the shaded area continues through to the background, the reflected light of the remaining portion is barely received on the surface 10. The location of the center point (the image formation point) in such a case is point P' (FIG. 4). The difference in the positions of the center points P (which does not entail the vignetting phenomenon) and P' manifests as an error in distance measurement due to the vignetting.

In addition, as more light continues through to the background in the baseline direction (right to left in FIG. 3), the error in distance measurement caused by vignetting becomes larger. Further, when the amount of reflected light is as shown in FIG. 4, peripheral rounding and tail are caused due to flaring of the light emitting and receiving lenses.

In the construction depicted in FIG. 3, i.e., when the baseline direction is from right to left when seen from above the camera (i.e., the distance measuring system), and the light emitting means is located on the left and the light receiving means is located on the right; if the projected light source image is off to the right of the object, the location of center point P' of the received light image on the surface 10 of PSD 1 provides information that the object distance is shorter than when the location of center point P is obtained with no vignetting. Such vignetting is called "close vignetting". Conversely, when the projected light source image is off to the left of the object, the location of center point P' of received light on the surface 10 of PSD 1 provides information that the object distance is longer than when the location of center point P is obtained with no vignetting. Such vignetting is called "far vignetting".

Further, in a converse construction in which the light emitting means is located on the right and the light receiving means is on the left, if the projected light source image is off to the right of the object, the location of center point P' of the received light image on the PSD 1 surface provides information that the object distance is longer than when the location of center point P is obtained with no vignetting; and if the light source image is off to the left of the object, the location of center point P' of the received light image on the PSD surface provides information that the object distance is shorter than when the location of center point P is obtained with no vignetting.

Among vignetting-corrective distance measurement systems proposed to date, the following two types of systems are known.

The first type of system is a distance measuring system in which two light receiving units are located over a certain baseline length at equal distances from and on either side of the light emitting device. Referring to FIG. 17, light source 3 is positioned between PSDs 1-L and 1-R. Light from the light source 3 is projected through light projecting lens 4 onto the object 5. The light receiving lenses 2-L and 2-R are positioned to focus the projected image 3' of light source 3 onto the surfaces of PSDs 1-L and 1-R, respectively. The shaded area in FIG. 17 indicates the portion which is correctly projected onto the object, and the remaining area of projected image 3' indicates the portion of the projected light which continues through to the background.

When a vignetting phenomenon as shown in FIG. 17 occurs (the light source image is off to the right of the object), the location of the center point of the light emitted from light source 3 and reflected by the object 5 differs from the correct location of the center point that would be obtained when there is no vignetting on PSD 1-L, indicating an object distance longer than the correct one (far vignetting). On PSD 1-R, the location of the center point of the light emitted from light source 3 and reflected by the object 5 differs from the correct location of the center point that is obtained when there is no vignetting, indicating a shorter object distance than the correct one (close vignetting). By calculating the object distances obtained on PSD 1-L and PSD 1-R (using averaging, etc), an accurate distance measurement output can be obtained.

A second type of conventional distance measuring system is explained width reference to FIG. 18. In FIG. 18, light sources LED1, LED2 AND LED3 project light through light projecting lens 4 toward object 5 to form projected images 3'-1, 3'-2 and 3'-3, respectively. The system of FIG. 18 is a multiple-point distance measuring system based on a method in which the distance measurement information from LED1, which is experiencing vignetting, is corrected by distance measurement information from another LED (LED2 or LED3) in its vicinity.

If it is assumed that the vignetting phenomenon shown in FIG. 18 occurs, the information from LED1 indicates a distance measurement shorter than the correct one (close vignetting), while the information from LED2 is correct because the light emitted by it is accurately projected onto the object 5. Because the light from LED3 passes through completely to the background, its information will indicate a distance measurement much longer than the correct object distance.

In the case of a multiple-point distance measuring system as above, it is common to use the information indicating the shortest object distance from among the information given from LED1, LED2 and LED3. Therefore, if vignetting correction is not performed under the situation shown in FIG. 18, the object distance information from LED1 is used, resulting in an erroneous distance measurement. However, the error in distance measurement is corrected in this system using the following method.

In this system, the reflectance of the object is assumed to be constant and it is presumed that the reflected light from the LED which gives the shortest object distance information constitutes the greatest amount of reflected light. Thus, in FIG. 18, the amount of reflected light is the largest from LED2, followed by LED1 and then LED3. As a result, it is understood that the amount of reflected light from LED1, which gives the shortest object distance information, is not the largest. Therefore, it is determined that this is because LED1 is experiencing close vignetting, and the object distance information for LED1 is not adopted. Since the information for LED2, which gives the next shortest object distance information, is adopted, a correct distance measurement output can be obtained.

In the first type of system described above, because two light receiving devices are necessary, the system requires one more set of a light receiving lens and light receiving element than in a conventional distance measuring system, which leads to a higher cost. In addition, because the light receiving devices are located symmetrically across a light emitting device over a certain baseline length, it requires twice as much space as a conventional system, which leads to a larger camera size.

In the second type of system described above, because the reflectance of the object is assumed to be uniform, if the reflectance of the object is in actuality, different for each LED, it quickly becomes unclear whether or not there is any vignetting. In addition, because a comparison with a nearby LED is necessary, this system can be applied only for multiple-point distance measurement and this method cannot be used for single-point distance measurement.

SUMMARY OF THE INVENTION

An objective of the present invention is to eliminate the shortcomings of the above-described conventional vignetting corrective systems and provide an inexpensive, compact and high-performance distance measuring system.

A distance measuring device according to the present invention includes a light projector, a controller, and a light receiver. The light projector projects light toward an object to be measured, and the controller controls the light projector to carry out a first light projection to emit a first light at a predetermined angle with a first light distribution, and subsequently to carry out a second light projection to emit a second light at the predetermined angle with a second light distribution which is different from the first light distribution. The light receiver receives the first and second light emitted by the light projector and reflected from the object, and produces light reception signals, and a circuit arrangement calculates a distance to the object by means of the light reception signals.

With the present invention, by projecting multiple distance measuring beams of light having different luminous intensity distributions toward a certain distance measurement point of the object at different times and calculating the object distance based on the output from the light receiver means which is obtained as a result of the projections, correct object distance information can be obtained even if vignetting exists.

In other words, with the present invention, even when a part of the light projected toward the object does not reach the object but continues through to the background, because the ratio between the portion of the projected light in the baseline direction reaching the object and the portion not reaching the object can be quantitatively understood, correct object distance information can be obtained.

According to a presently preferred embodiment of the invention, the light receiver comprises a light reception surface and produces the light reception signal which represents a position of the incident light within the light reception surface, and the light projector comprises two terminals and a light projection surface arranged between the terminals. The controller controls the light projector in such a manner that one of the terminals is activated first and the other of the terminals is activated second.

According to a further embodiment of the invention, the controller further controls the light projector to carry out a third light projection to emit a third light at the predetermined angle with a third light distribution which is different from the first and the second light distributions. The light receiver receives the third light emitted by the light projector and reflected from the object and produces a third light reception signal, and the circuit arrangement calculates a correction value based on two of the light reception signals and corrects the rest of the light reception signals to obtain the object distance.

Additional objects, features, and advantages of the present invention will become apparent to those skilled in the art upon consideration of the following detailed description of presently preferred embodiments.

BRIEF DESCRIPTION OF THE DRAWINGS

FIGS. 8(a)–8(d) are illustrations showing the light emission profiles of the LED of the present invention;

DETAILED DESCRIPTION OF THE PREFERRED EMBODIMENTS

A first embodiment of the present invention is explained below with reference to the drawings. As a matter of information, the distance measuring system embodied herein is of the type illustrated in FIG. 1.

Figure 5:
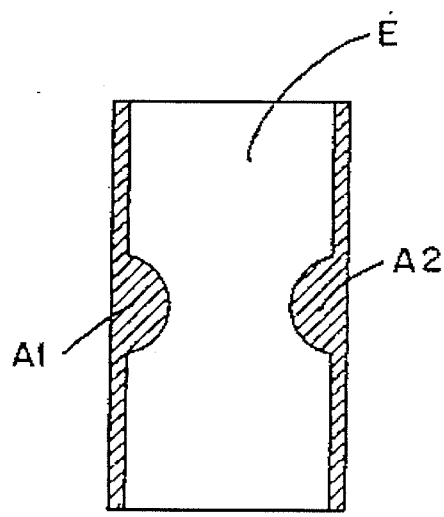
FIG. 5 is an illustration showing the LED chip of the present invention.
Figure 7A:
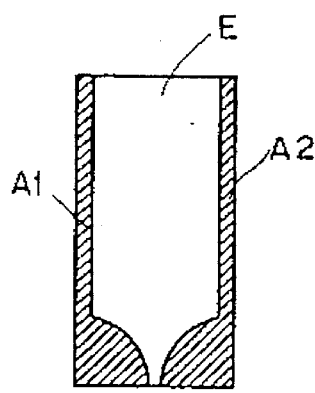
FIGS. 7(a)–7(i) are illustrations showing various layouts of the LED chip of the present invention.
Figure 7B:
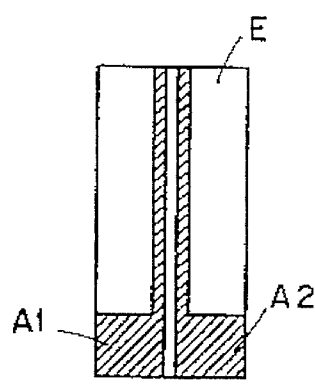
Figure 7C:
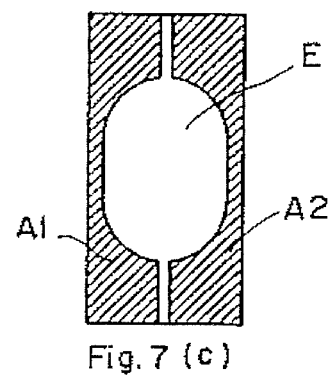
Figure 7D:
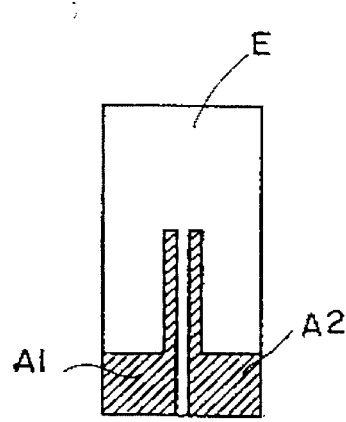
Figure 7E:
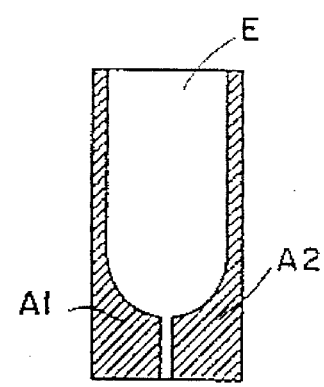
Figure 7F:
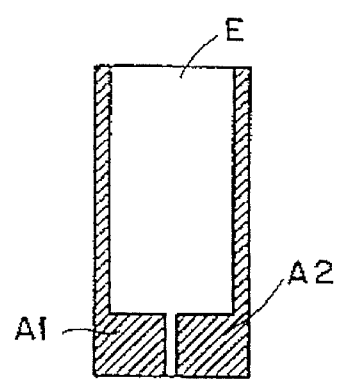
Figure 7G:
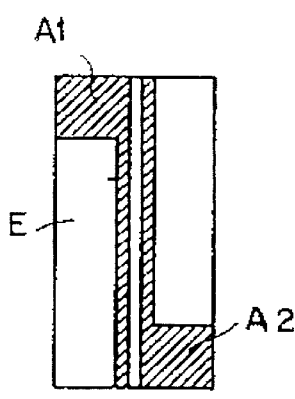
Figure 7H:
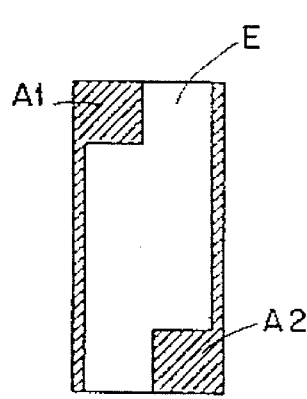
Figure 7I:
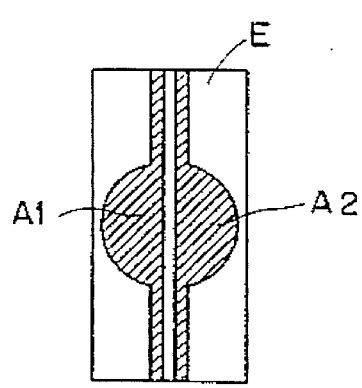

FIG. 5 illustrates an LED chip (light source 3 of FIG. 1) according to the present invention. The shaded areas A1 and A2 are anodes and E is the light emitting surface. A cathode is connected to a lead frame which is not shown in the drawing.

Figure 6A:
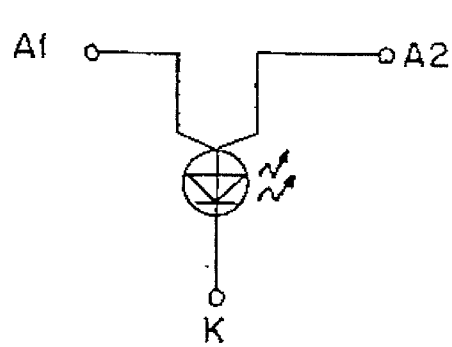
FIGS. 6(a) and 6(b) are illustrations showing the equivalent circuit of the LED of the present invention.
Figure 6B:
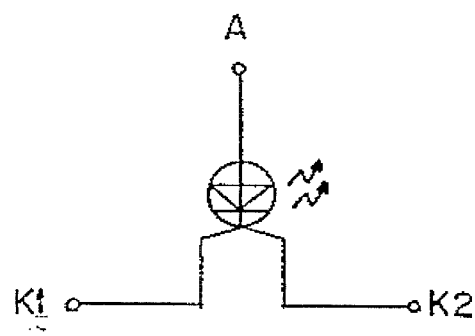

FIG. 6(a) is an equivalent circuit of the LED of the present invention. Being cathode-common, two anodes A1 and A2 and one cathode K are connected to one chip. In the case of an anode-common LED, the equivalent circuit will look like the one shown in FIG. 6(b) wherein two cathodes K1 and K2 and one anode A are connected to one chip. The present invention is explained based on the cathode-common LED of FIG. 6(a).

FIGS. 7(a) through 7(i) illustrate various alternative configurations of the LED chip of FIG. 5. As in FIG. 5, the two shaded areas in each FIG. are the anodes A1 and A2 and the non-shaded area is the light emitting surface E.

The light emission profiles of the LED of the present invention are explained with reference to FIGS. 8(a)–8(d). FIG. 8(a) shows the LED chip of FIG. 5 and FIG. 8(b) shows the light emission profile on the sectional line 1—1 of FIG. 8(a) when electric current is made to run only to anode A1 of the LED. The vertical axes shown in FIGS. 8(b) through 8(d) indicate the amount of light. The amount of light is larger on the A1 side (the left-hand side) in FIG. 8(b) and it gradually decreases toward anode A2 (the right-hand side). FIG. 8(c) shows the light emission profile on the sectional line 1—1 shown in FIG. 8(a) when electric current is run only to anode A2 of the LED of the present invention. The amount of light is larger on the A2 side (the right-hand side) and it gradually decreases toward A1 (the left-hand side). FIG. 8(d) shows the light emission profile when electric current is run to both A1 and A2. Compared to FIGS. 8(b) and 8(c), this light emission profile is symmetrical across the center line of the LED chip.

It should be recognized that light emission profiles on a line parallel to sectional line 1—1 of FIG. 8(a) will look the same as those shown in FIGS. 8(b), 8(c) and 8(d).

Figure 1:
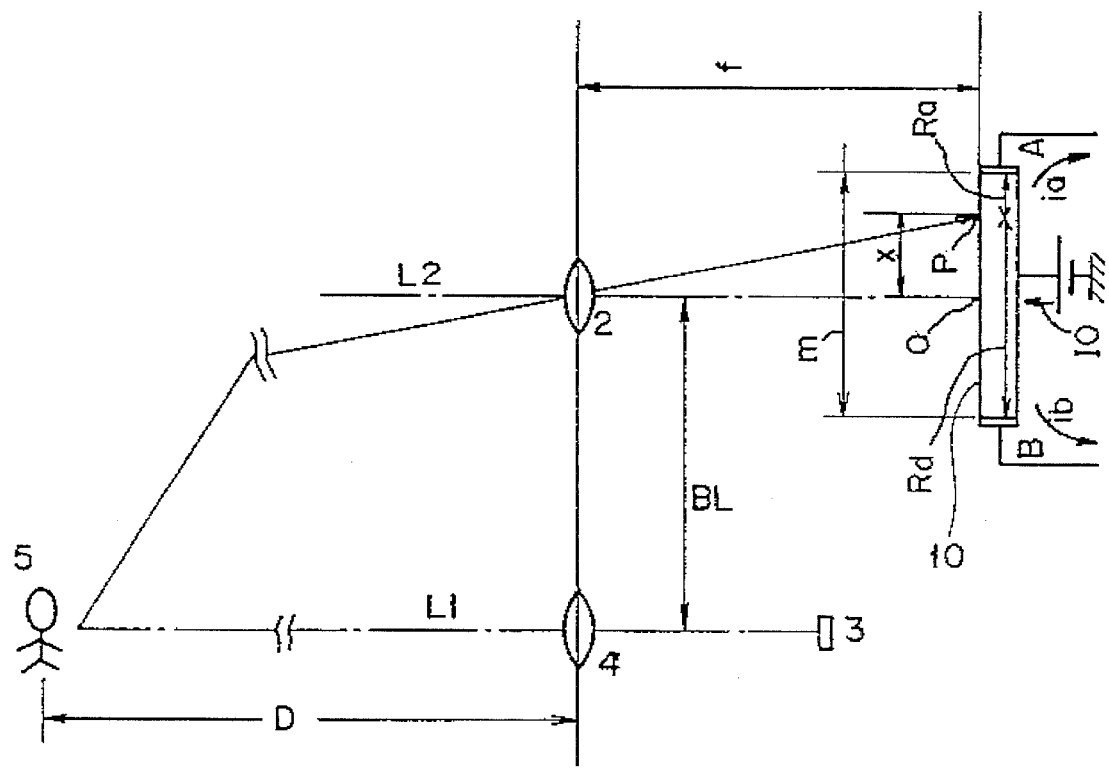
FIG. 1 is an illustration explaining the distance measurement principle of the distance measuring system of the present invention.
Figure 2:
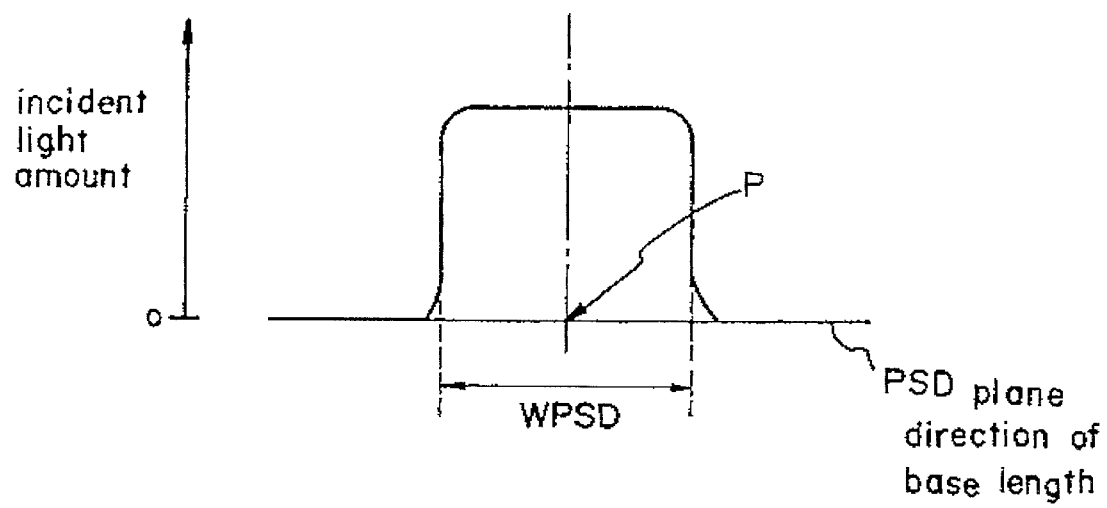
FIG. 2 is an illustration showing the location of the center point of the LED image formed on the PSD surface of FIG. 1.
Figure 3:
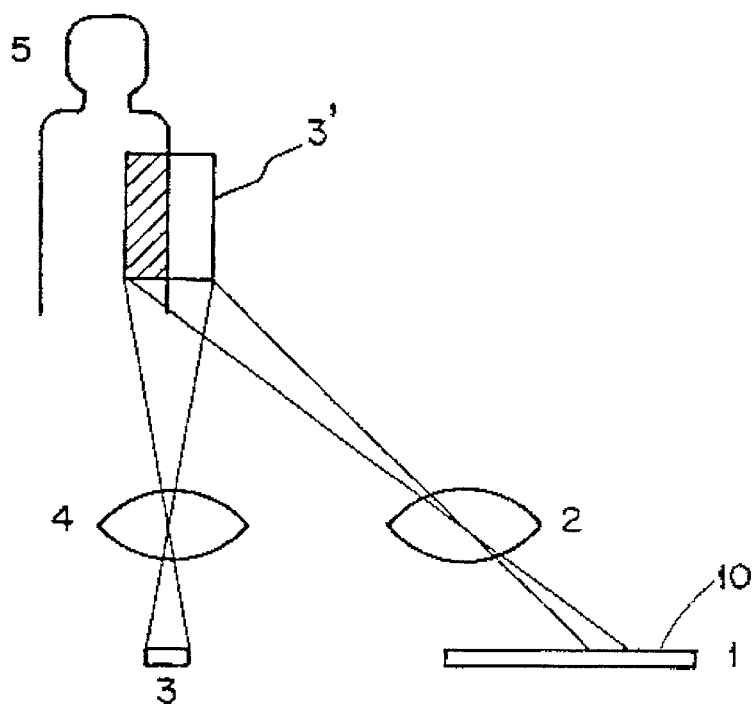
FIG. 3 is an illustration showing a vignetting phenomenon.
Figure 4:
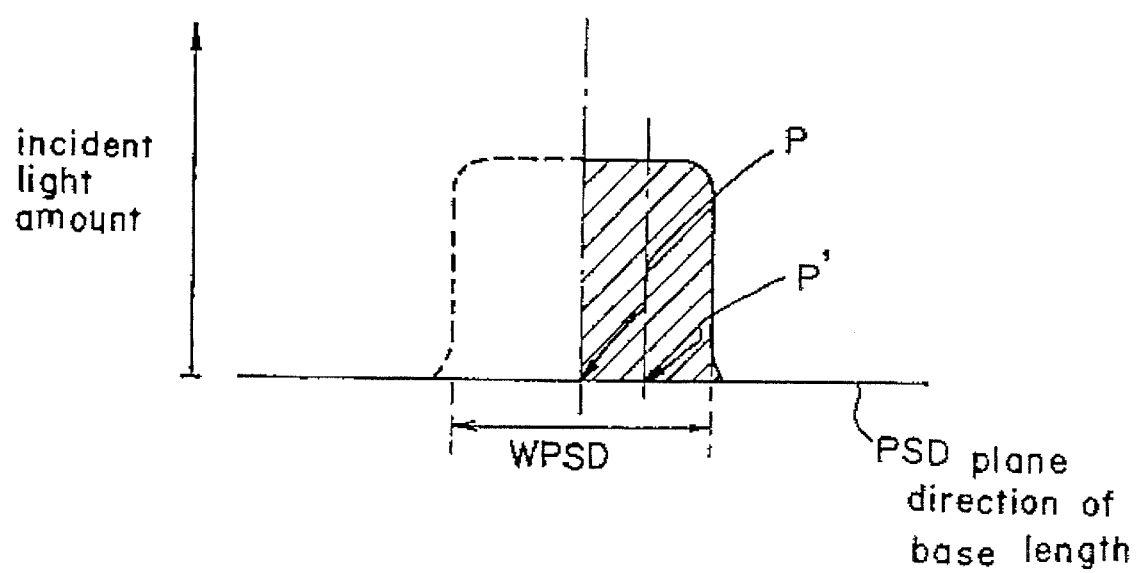
FIG. 4 is an illustration showing the location of the center point of the LED image formed on the PSD surface of FIG. 3 when there is a vignetting phenomenon.

Next, the vignetting detection mechanism using the LED chip of the present invention is explained with reference to FIGS. 9(a)–9(f) and 10(a)–10(f). The horizontal axes shown in FIGS. 9(a), 9(b), 9(c), 9(d), 9(e) and 9(f) indicate the baseline direction on the PSD surface and the vertical axes show the amount of light of the LED images formed on the PSD surface. The shaded areas refer to the portion of the light reflected by an object and received by the PSD, while the non-shaded areas refer to the portion which continues through to the background and is not reflected by the object and, thus, is not received by the PSD. In addition, the rounding and tail at the periphery of the amount of reflected light is caused due to flaring, etc. of the light projecting and light receiving lenses 2 and 4 (FIG. 1). Incidentally, as shown in FIG. 3, the light emitting device of the distance measuring system is located on the left-hand side and the light receiving device is located on the right-hand side as the baseline direction runs right to left. Further, regarding the locations of anodes A1 and A2 of the LED, A2 is on a side of the light receiving device and A1 is on the opposite side of the light receiving device along the baseline direction.

Figure 9:
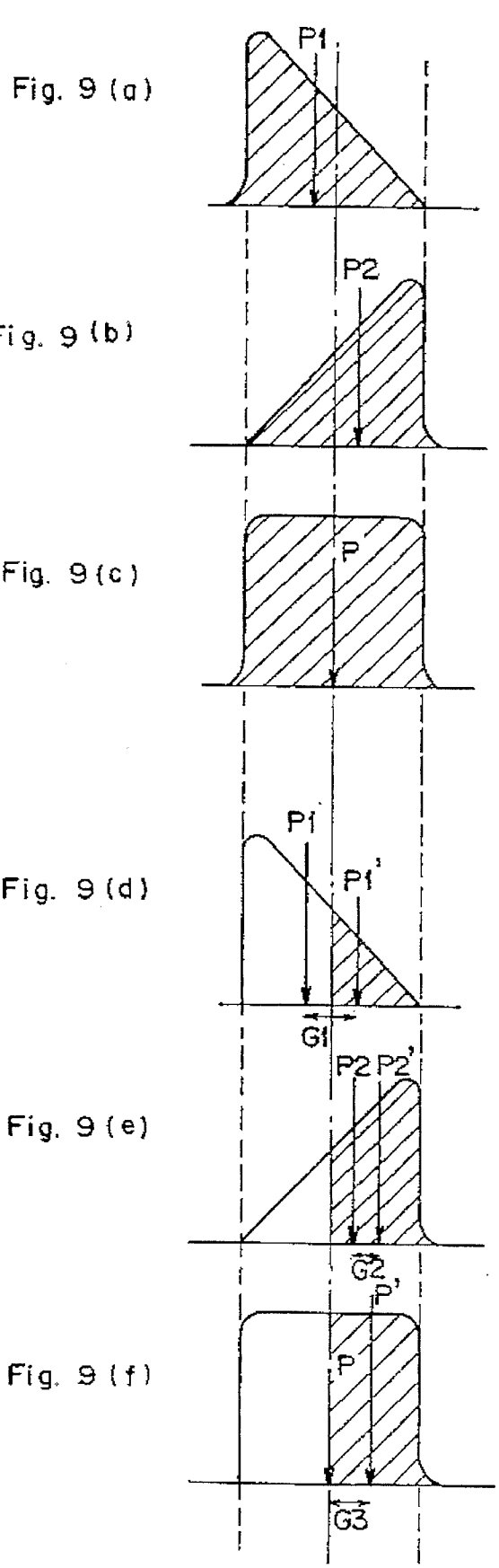
FIGS. 9(a)–9(f) are illustrations showing the locations of the center point of the LED image formed on the PSD surface when there is no vignetting and when there is vignetting.

FIGS. 9(a) through 9(c) show the locations of the center points of the LED image formed on the PSD surface when no vignetting phenomenon occurs. In FIG. 9(a), electricity is run to A1 only and the location of the center point of the light reflected by the object and received on the PSD surface is P1. In FIG. 9(b), electricity is run to A2 only and the location of the center point of the light reflected by the object and received on the PSD surface is P2. In FIG. 9(c), electricity is run to both A1 and A2 and the location of the center point of the light reflected by the object and received on the PSD surface is P.

FIGS. 9(d) through 9(f) show the locations of the center points of the LED image formed on the PSD surface in the case where vignetting occurs, i.e., where the right half of the light emitted from the LED continues through to the background as shown in FIG. 3.

In FIG. 9(d), electricity is run to A1 only and the location of the center point of the light reflected by the object and received on the PSD is P1', Compared with the location of center point P1 when there is no vignetting, the location of the center point shifts by as much as G1. In FIG. 9(e), electricity is run to A2 only and the location of the center point of the light reflected by the object and received on the PSD surface is P2'. Compared with the location of center point P2 when there is no vignetting, the location of the center point shifts by as much as G2. In FIG. 9(f), electricity is run to both A1 and A2 and the location of the center point of the light reflected by the object and received on the PSD surface is P'. Compared with the location of center point P when there is no vignetting, the location of the center point shifts by as much as G3.

As evidenced above, if there is vignetting, the amount of shift G1, G2 and G3 in the location of the center point when electric current is run to A1 only, A2 only and both A1 and A2, respectively, varies. As is evident from the FIGS., the amount of shift G1 in the location of the center point is large when electric current is run to A1 only, while the amount of shift G2 in the location of the center point is small when electric current is run to A2 only.

Figure 10A:
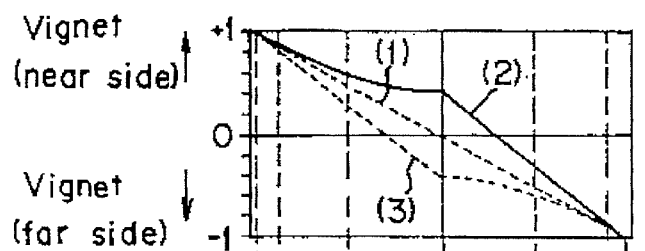
FIGS. 10(a)–10(f) are illustrations explaining, with regard to the present invention, the relationships among the degree of vignetting, the amount of shift in the location of the center point and the amount of incident light.
Figure 10B:
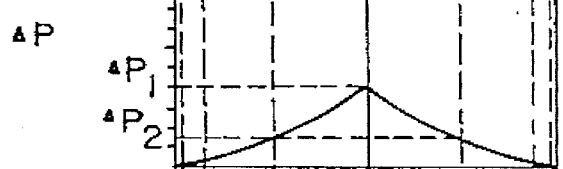
Figure 10C:
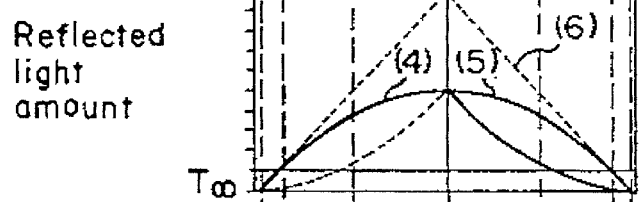
Figure 10D:
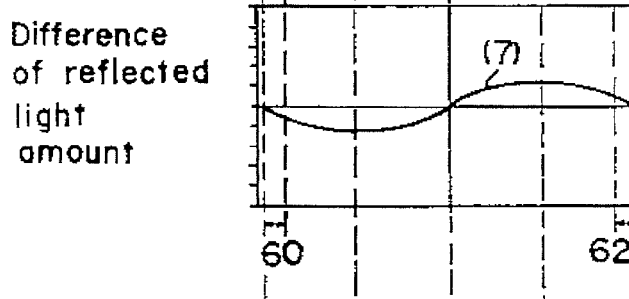
Figure 10E:
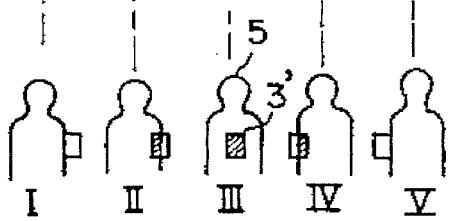

The relationship between the degree of vignetting and the amount of shift in the location of the center point, is explained with reference to FIGS. 10(a) through 10(f). FIG. 10(e) is an illustration to explain the horizontal axes shown in FIGS. 10(a) through 10(d). An LED image 3' is projected on an object 5 located at a certain distance. FIG. 10(e)-III shows the situation in which the LED image 3' is projected on the center of the object 5, causing no vignetting. FIG. 10(e)-II shows a situation in which the LED image 3' is projected toward the right of the object 5 and the right half of the LED light continues through to the background, causing close vignetting. FIG. 10(e)-IV shows a situation in which the LED image 3' is projected toward the left of the object 5 and the left half of the LED light continues through to the background, causing far vignetting. FIG. 10(e)-I shows a situation in which the LED image 3' is projected toward the right of the object 5 and most of the LED light continues through to the background. FIG. 10(e)-V shows a situation in which the LED image 3' is projected toward the left of the object 5 and most of the LED light continues through to the background.

Curve (1) in FIG. 10(a) shows the location of the center point (object distance information) of the light reflected by the object and received on the PSD when electric current is run to both A1 and A2. Curve (2) shows the location of the center point (object distance information) of the light reflected by the object 5 and reflected on the PSD when electric current is run to A2 only. Curve (3) shows the location of the center point (object distance information) of the light reflected by the object and received on the PSD when electric current is run to A1 only.

As mentioned above, the vertical axis indicates the location of the center point (object distance information) and as the value becomes larger, a shorter distance is indicated, and as the value becomes smaller, a longer distance is indicated. Here, complete close vignetting is +1, complete far vignetting is −1 and no vignetting is FIG. 10(b) shows the result of subtraction of curve (3) from curve (2) of FIG. 10(a). The result of this subtraction is largest when there is no vignetting, and becomes smaller as the degree of close vignetting or far vignetting increases. FIG. 10(c) shows the amounts of light reflected by the object when electric current is run to A1 only, A2 only and both A1 and A2. Curve (4) shows the amount of light reflected by the object when electric current is run to A2 only, curve (5) shows the amount of light reflected by the object when electric current is run to A1 only, and curve (6) shows the amount of light reflected by the object when electric current is run to both A1 and A2. Here, if curve (6) is lower than a certain level (V∞), it is determined that S/N is low and the reliability of the information regarding the location of the center point to be calculated is low. Such a situation occurs when the LED image is barely projected onto the object, such as in the situations indicated by the side bands 60 and 62 in FIGS. 10(a)–10(d), for example. Curve (7) in FIG. 10(d) is the result of subtraction of curve (4) from curve (5) and the resulting difference is negative in close vignetting situations and positive in far vignetting situations.

Figure 10F:
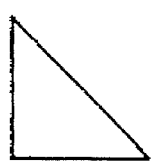

In order to simplify calculations, for the data in FIGS. 10(a) through 10(d), the amounts of reflected light received by the PSD when electric current is run to A1 only, A2 only and both A1 and A2 are idealized as right triangles or as a rectangle, as shown in FIG. 10(f). In actuality, because of the influence of uneven luminescence of the LED surface and flaring of the light projecting and light receiving lenses, the corners are rounded. However, this does not affect the accuracy of vignetting detection.

As can be seen from FIG. 10(b), the difference in the location of the center point between curve (3) when electric current is run to A1 only and curve (2) when electric current is run to A2 only indicates the degree of vignetting. This difference ΔP does not change with a change in object distance but changes only when the degree of vignetting changes. For example, in FIG. 10(b), when ΔP is ΔP1, it can be determined that there is no vignetting, while when ΔP is ΔP2, it can be determined that half vignetting is occurring. However, it is impossible to know whether it is close vignetting or far vignetting based only on this difference in the location of center point ΔP. Therefore, the above-described information shown by curve (7) in FIG. 10(d), that is, the information which indicates a negative value in the case of close vignetting and a positive value in the case of far vignetting, is used.

As described above, by looking at the difference in the location of the center point between curve (3) when electric current is run to A1 only and curve (2) when electric current is run to A2 only, the degree of vignetting can be calculated quantitatively. In addition, by comparing curve (5), the amount of light received when electric current is run to A1 only, and curve (2), the amount of light received when electric current is run to A2 only, it can be determined whether the vignetting is close vignetting or far vignetting. Therefore, even where there is a vignetting phenomenon, correct object distance information can be obtained by correcting the location of the center point, i.e., the object distance information, when electric current is run to both A1 and A2, based on the degree of vignetting.

Incidentally, although it has been explained that the difference in the location of the center point between curve (3) when electric current is run to A1 only and curve (2) when electric current is run to A2 only is used, it is also acceptable to use the difference in the location of the center point between curve (3) when electric current is run to A1 only and curve (1) when electric current is run to both A1 and A2, or the difference in the location of the center point between curve (2) when electric current is run to A2 only and curve (1) when electric current is run to both A1 and A2.

The operation of the distance measuring device of the present invention, which drives and controls the LED, detects vignetting and corrects the distance measurement output, will now be explained with reference to FIG. 11, which is a block diagram of the control circuit 80 of the present invention. LED 3 of the present invention includes two anode terminals A1 and A2 as mentioned above. LED driving circuit 7 provides electric current to LED 3. It allows electricity to flow to A1 only, A2 only or both A1 and A2 for a prescribed period of time based on the control signal from a microcomputer 8 which is described below. As described with reference to FIG. 1, light is emitted from LED 3 through a light projecting lens 4 toward an object 5. PSD 1 receives the pulse light reflected from the object 5 through a light receiving lens 2 and outputs electric currents ia or ib from the two anode terminals A1, A2 corresponding to the location of the center point of the incident light. PSD surface 10 receives a combined input of a fixed light, such as sunlight, and the pulse light emitted from the light emitting means and reflected from the object.

PSD 1 produces a direct current component in response to the input of a fixed light and produces a pulse light current corresponding to the pulse light emitted from the light emitting means and reflected from the object. The control circuit 80 of FIG. 11 cuts off the direct current component and amplifies only the pulse light current. The control circuit 80 also operates the switch for integration timing, etc., according to a control signal from microcomputer 8, performs calculation of the object distance signals and monitors the reflected light amount signals via the pulse light current, and outputs the results as VOUT to microcomputer 8.

Microcomputer 8 is a control circuit which outputs the above control signal to LED driving circuit 7 to run electric current to the LED and control signals to distance measuring circuit 6 to control the distance measurement sequence. It also carries out analog-to-digital (A/D) conversion of the object distance signals and object-reflected light amount signals output from distance measuring circuit 6, detects vignetting through a certain calculation, corrects the object distance signal based on the vignetting information and outputs the degree of focusing to the lens drive circuit (not shown in FIG. 11). It also carries out infinity determination where, when the value of the reflected light signal from distance measurement circuit 6 is below a certain level (V∞) in the above calculation, it is determined that S/N is low and the reliability of the information to be calculated regarding the location of the center point is low. Memory 9 such as an EEPROM stores adjustment values necessary for distance measuring circuit 6, etc.

Figure 11:
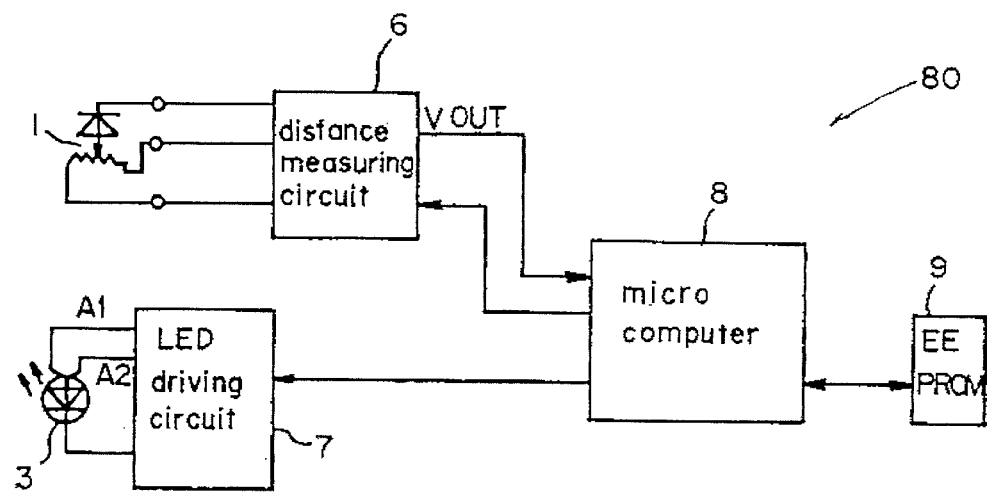
FIG. 11 is a block diagram of the control circuit of the present invention.
Figure 12:
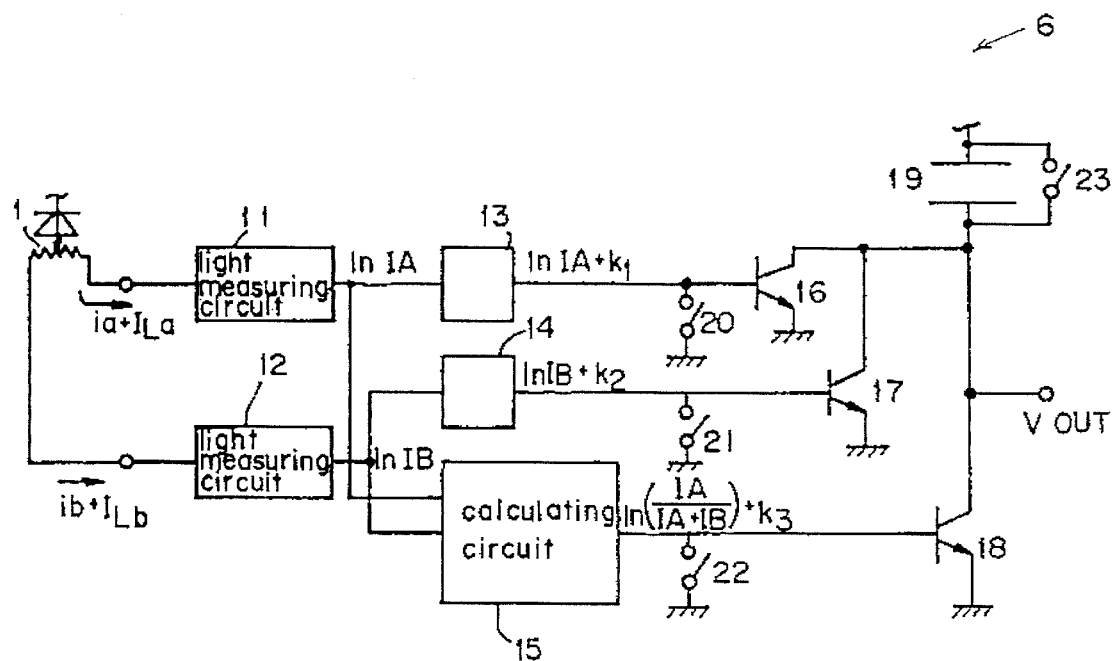
FIG. 12 is a block diagram of the distance measurement circuit of a first embodiment of the present invention.

FIG. 12 is a more detailed block diagram of the distance measuring circuit 6 of FIG. 11. Corresponding components have the same reference numbers in FIGS. 11 and 12. Light measuring circuit 11 inputs current from one terminal of PSD 1, cuts off the direct current component ILa, amplifies only the pulse light current ia corresponding to the pulse light emitted from the light emitting means and reflected from the object (ia→IA) and outputs the amplification result via logarithmic compression (lnIA). Light measuring circuit 12 inputs current from the other terminal of PSD 1, cuts off the direct current component ILb, amplifies only the pulse light current ib corresponding to the pulse light emitted from the light emitting means and reflected by the object (ib→IB) and outputs the amplification result via logarithmic compression (lnIB). An interface circuit 13 works (i) as a buffer in response to output voltage (lnIA) output from light measuring circuit 11 so that switch 20 down the line will not affect calculation circuit 15, (ii) has an adjustment circuit, such as a level shift, which adjusts the amount of collector current of transistor 16 down the line so that integration condenser 19 further down the line will operate within the appropriate voltage range, and (iii) outputs output voltage lnIA+k1. Interface circuit 14, (i) works as a buffer in response to output voltage lnIB from light measuring circuit 12 so that the switch 21 down the line will not affect calculation circuit 15, (ii) has an adjustment circuit, such as a level shift, which adjusts the amount of collector current of transistor 17 down the line so that integration condenser 19 further down the line will operate within the appropriate voltage range, and (iii) outputs output voltage lnIB+k2. Calculation circuit 15, in response to output lnIA and lnIB from light measuring circuits 11 and 12, (i) calculates ln(IA/(IA+IB)), (ii) has an adjustment circuit, such as a level shift, which adjusts the amount of collector current of transistor 18 down the line so that integration condenser 19 further down the line will operate within the appropriate voltage range, and (iii) outputs output voltage ln(IA/(IA+IB))+k3.

Incidentally, adjustment values for these adjustment circuits may be stored in memory elements not shown in the drawing, such as registers, via data input from microcomputer 8. Transistor 16 extends the output from interface circuit 13, transistor 17 extends the output from interface circuit 14, and transistor 18 extends the output from calculation circuit 15. Transistors 16, 17 and 18 output currents corresponding to IA, IB and IA/(IA+IB), respectively, as collector currents. An integration condenser 19 integrates the collector currents from transistors 16, 17 and 18. Its integration voltages are the object distance signals and reflected light amount signals and are output to microcomputer 8 as VOUT. Switch 20 turns transistor 16 on and off, switch 21 turns transistor 17 on and off, and switch 22 turns transistor 18 on and off. Integration switch 23 turns on and off integration condenser 19. When the switch is turned on, integration condenser 19 is initialized. When it is turned off, it allows the recharging or holding of integration condenser 19 in relay with switches 20, 21 and 22. As described above, since the reflected light amount monitoring process includes extension/integration functions, high-precision output can be obtained.

Figure 14:
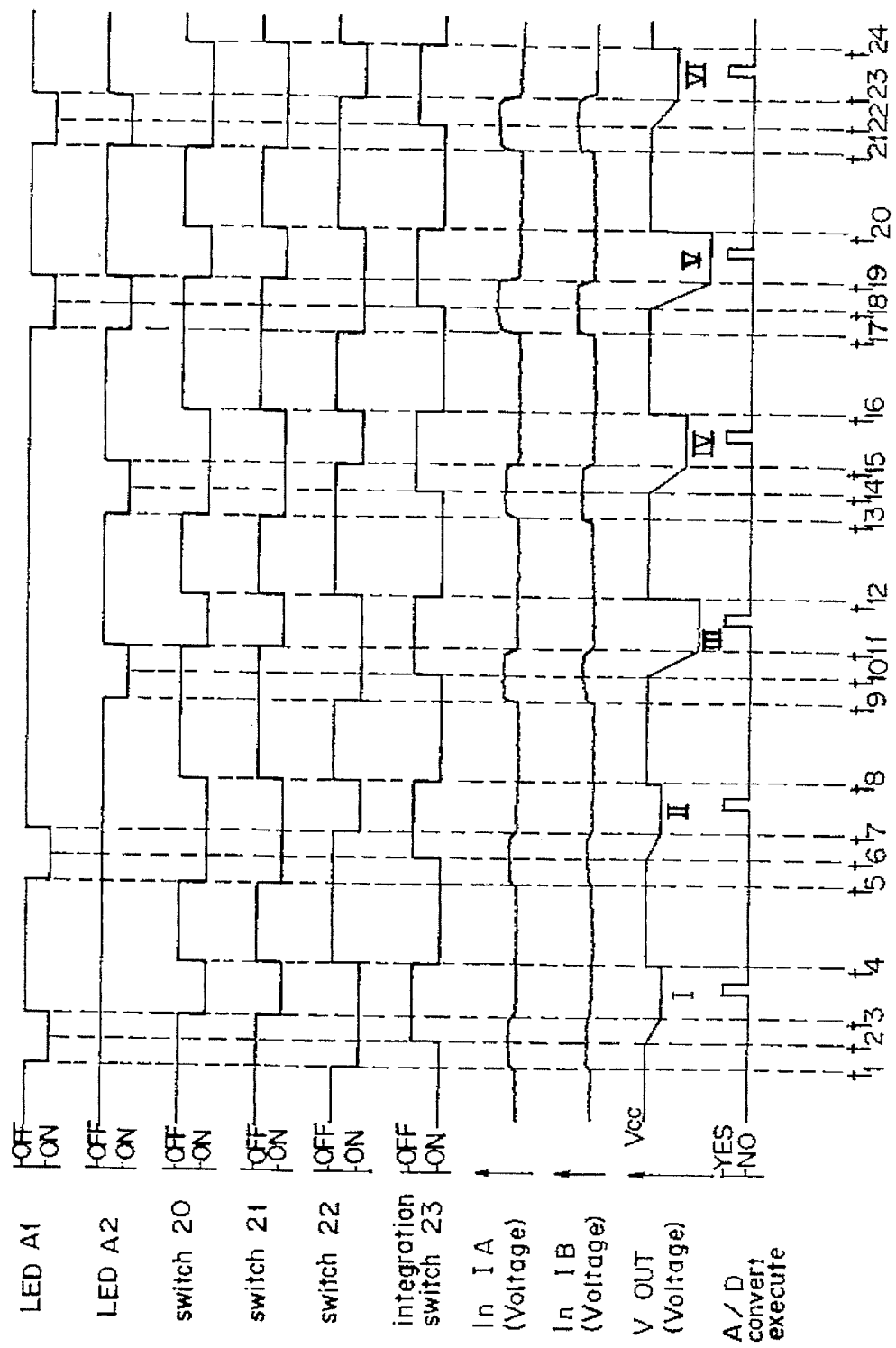
FIG. 14 is a timing chart of the operation of distance measurement with regard to the first embodiment of the present invention.
Figure 16:
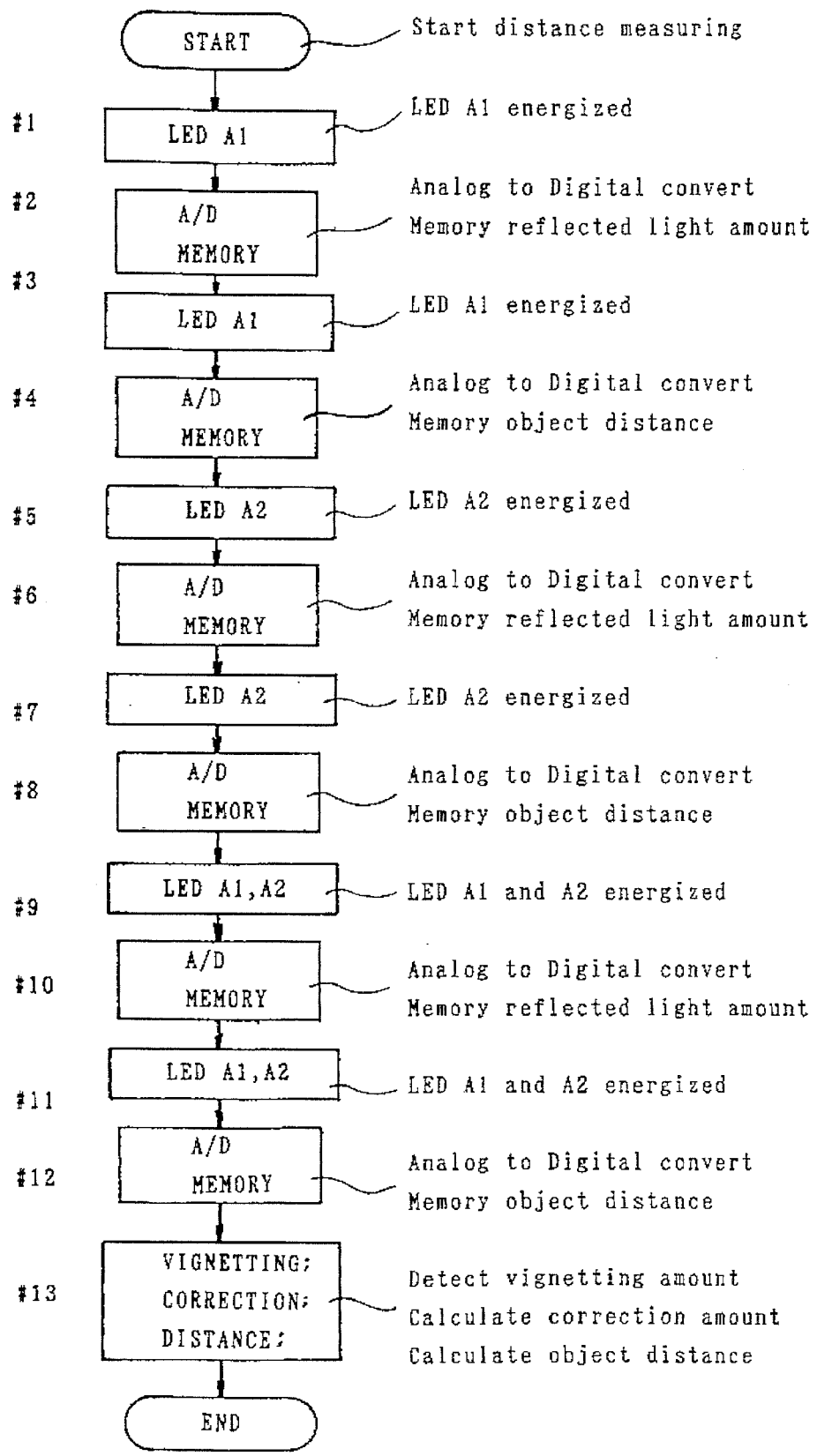
FIG. 16 is a flow chart showing the operation of the microcomputer of the first embodiment of the present invention.
Figure 17:
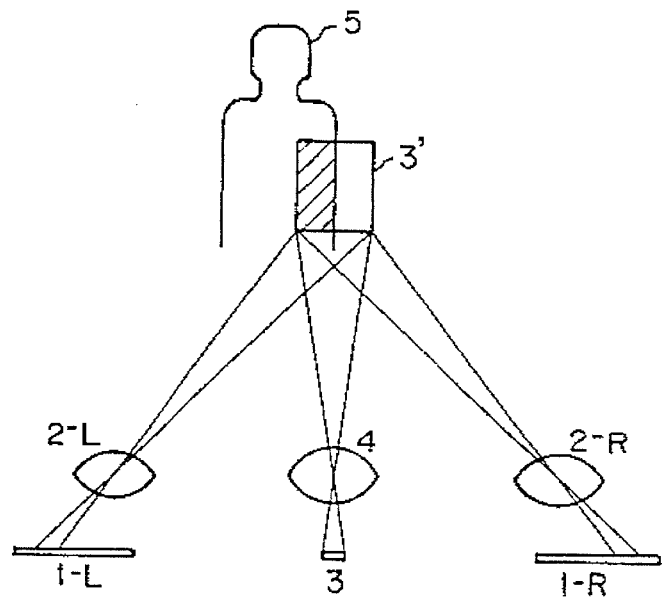
FIG. 17 is an illustration explaining a first type of conventional vignetting-corrective distance measuring system.
Figure 18:
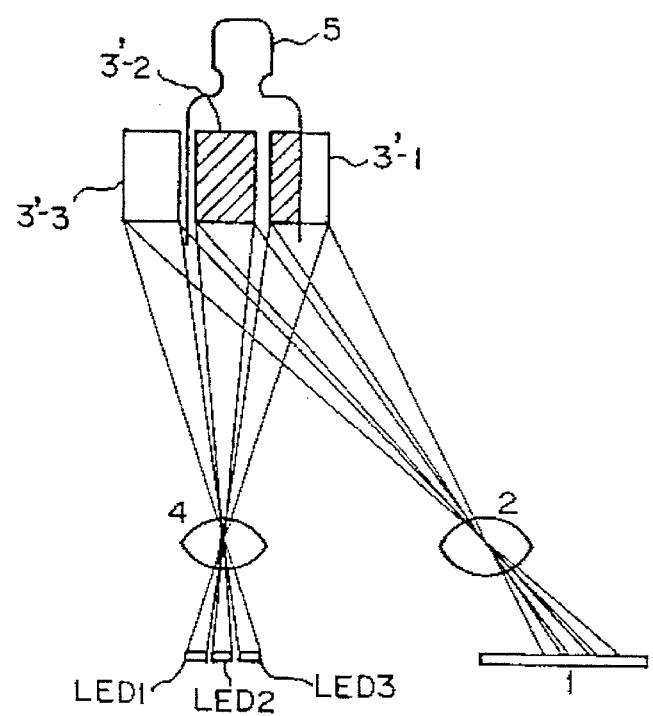
FIG. 18 is an illustration explaining a second type of conventional vignetting-corrective distance measuring system.

Next, the distance measurement operation sequence is explained with reference to FIGS. 11 and 12, the timing chart of FIG. 14 and the flow chart of FIG. 16. In FIGS. 14 and 16, electric current is run to A1 of LED 3 for the period between t1 and t3 via LED drive circuit 7 (step #1 of FIG. 16). During this period, while electricity is run to the LED, switches 20 and 21 are turned off (transistors 16 and 17 are on) while switch 22 is turned on (transistor 18 is off). When this is happening, the addition of collector currents of transistors 16 and 17, i.e., the reflected light amount signal, is about to be charged to integration condenser 19. Further, during the period between t2 and t3, integration switch 23 is turned off and the addition of collector currents of transistors 16 and 17 (reflected light amount signal) is charged to integration condenser 19. Next, during the period between t3 and t4, because switches 20 and 21 are turned on, transistors 16 and 17 are turned off and the charging stops, and because integration switch 23 is off, the integration voltage of integration condenser 19 is put on hold ((I) in FIG. 14), and microcomputer 8 carries out A/D conversion and saves the reflected light amount signal within this period (step #2 of FIG. 16).

Next, electric current is run to A1 of LED 3 for the period between t5 and t7 via LED drive circuit 7 (step #3 of FIG. 16). During this period, while electricity is run to the LED, switches 20 and 21 are turned on (transistors 16 and 17 are off) and switch 22 is turned off (transistor 18 is on). When this is happening, the collector current of transistor 18, i.e., the object distance signal, is about to be charged to integration condenser 19. Further, during the period between t6 and t7, integration switch 23 is turned off and the collector current of transistor 18 (object distance signal) is charged to integration condenser 19. Then, during the period between t7 and t8, because switch 22 is turned on, transistor 18 is turned off and the charging stops, and because integration switch 23 is off, the integration voltage of integration condenser 19 is put on hold ((II) in FIG. 14), and microcomputer 8 carries out A/D conversion and saves the object distance signal within this period (step #4 of FIG. 16).

Electric current is run to A2 of LED 3 in the same manner as above. With reference to FIGS. 14 and 16, first, electric current is run to A2 of LED 3 for the period between t9 and t11 via LED drive circuit 7 (step #5 of FIG. 16). During this period, while electricity is run to the LED, switches 20 and 21 are turned off (transistors 16 and 17 are on) while switch 22 is turned on (transistor 18 is off). When this is happening, the addition of collector currents of transistors 16 and 17, i.e., the reflected light amount signal, is about to be charged to integration condenser 19. Further, during the period between t10 and t11, integration switch 23 is turned off and the addition of collector currents of transistors 16 and 17 (reflected light amount signal) is charged to integration condenser 19. Next, during the period between t11 and t12, because switches 20 and 21 are turned on, transistors 16 and 17 are turned off and the charging stops, and because integration switch 23 is off, the integration voltage of integration condenser 19 is put on hold ((III) in FIG. 14), and microcomputer 8 carries out A/D conversion and saves the reflected light amount signal within this period (step #6). Then, electric current is run to A2 of LED 3 for the period between t13 and t15 via LED drive circuit 7 (step #7). During this period, while electricity is run to the LED, switches 20 and 21 are turned on (transistors 16 and 17 are off) and switch 22 is turned off (transistor 18 is on). When this is happening, the collector current of transistor 18, i.e., the object distance signal, is about to be charged to integration condenser 19. Further, during the period between t14 and t15, integration switch 23 is turned off and the collector current of transistor 18 (object distance signal) is charged to integration condenser 19. Next, during the period between t15 and t16, because switch 22 is turned on, transistor 18 is turned off and the charging stops, and because integration switch 23 is off, the integration voltage of integration condenser 19 is put on hold ((IV) in FIG. 14), and microcomputer 8 carries out A/D conversion and saves the object distance signal within this period (step #8 of FIG. 16).

Electric current is run to both A1 and A2 of LED 3 in the same manner as above. With reference to FIGS. 14 and 16, first, electric current is run to both A1 and A2 of LED 3 for the period between t17 and t19 via LED drive circuit 7 (step #9 of FIG. 16). During this period, while electricity is run to the LED, switches 20 and 21 are turned off (transistors 16 and 17 are on) while switch 22 is turned on (transistor 18 is off). When this is happening, the addition of collector currents of transistors 16 and 17, i.e., the reflected light amount signal, is about to be charged to integration condenser 19. Further, during the period between t18 and t19, integration switch 23 is turned off and the addition of collector currents of transistor 16 and 17 (reflected light amount signal) is charged to integration condenser 19. Then, during the period between t19 and t20, because switches 20 and 21 are turned on, transistors 16 and 17 are turned off and the charging stops, and because integration switch 23 is off, the integration voltage of integration condenser 19 is put on hold ((V) in FIG. 14), and microcomputer 8 carries out A/D conversion and saves the reflected light amount signal within this period (step #10 of FIG. 16).

Next, electric current is run to both A1 and A2 of LED 3 for the period between t21 and t23 via LED drive circuit 7

(step #11 of FIG. 16). During this period, while electricity is run to the LED, switches 20 and 21 are turned on (transistors 16 and 17 are off) and switch 22 is turned off (transistor 18 is on). When this is happening, the collector current of transistor 18, i.e., the object distance signal is about to be charged to integration condenser 19. Further, during the period between t22 and t23, integration switch 23 is turned off and the collector current of transistor 18 (object distance signal) is charged to integration condenser 19. Then, during the period between t23 and t24, because switch 22 is turned on, transistor 18 is turned off and the charging stops, and because integration switch 23 is off, the integration voltage of integration condenser 19 is put on hold ((VI) in FIG. 14), and microcomputer 8 carries out A/D conversion and saves the object distance signal within this period (step #12 of FIG. 16). Next, based on the reflected light amount signals obtained in steps #2, #6 and #10 when electric current was run to A1 only, A2 only and both A1 and A2, respectively, and the object distance signals obtained in steps #4, #8 and #12 when electric current was run to A1 only, A2 only and both A1 and A2, respectively, the degree of vignetting is detected, the amount of correction needed to correct the object distance signal obtained when electric current was run to both A1 and A2 is calculated and the correct object distance is obtained (step #13 of FIG. 16).

With reference to the light emission sequence shown in FIGS. 14 and 16, an explanation has been given in the order of (i) the monitoring of the reflected light amount signal and the object distance signal when electric current is run to A1, (ii) the monitoring of the reflected light amount signal and the object distance signal when electric current is run to A2, and (iii) the monitoring of the reflected light amount signal and the object distance signal when electric current is run to both A1 and A2; but this sequence need not be followed exactly. For example, the sequence may be (i) the monitoring of the reflected light amount signal when electric current is run to A1, (ii) the monitoring of the reflected light amount signal when electric current is run to A2, (iii) the monitoring of the reflected light amount signal when electric current is run to both A1 and A2, (iv) the monitoring of the object distance signal when electric current is run to A1, (v) the monitoring of the object distance signal when electric current is run to A2, and (vi) the monitoring of the object distance signal when electric current is run to both A1 and A2.

In addition, in FIGS. 14 and 16, the monitoring of the reflected light amount signal and the object distance signal when electric current is run to A1, the monitoring of the reflected light amount signal and the object distance signal when electric current is run to A2, and the monitoring of the reflected light amount signal and the object distance signal when electric current is run to both A1 and A2 are each performed once in sequence to simplify the explanation. However, needless to say, in actuality, they are each performed several times in order to increase S/N via calculation of the average by microcomputer 8 so that more precise data can be output.

Figure 13:
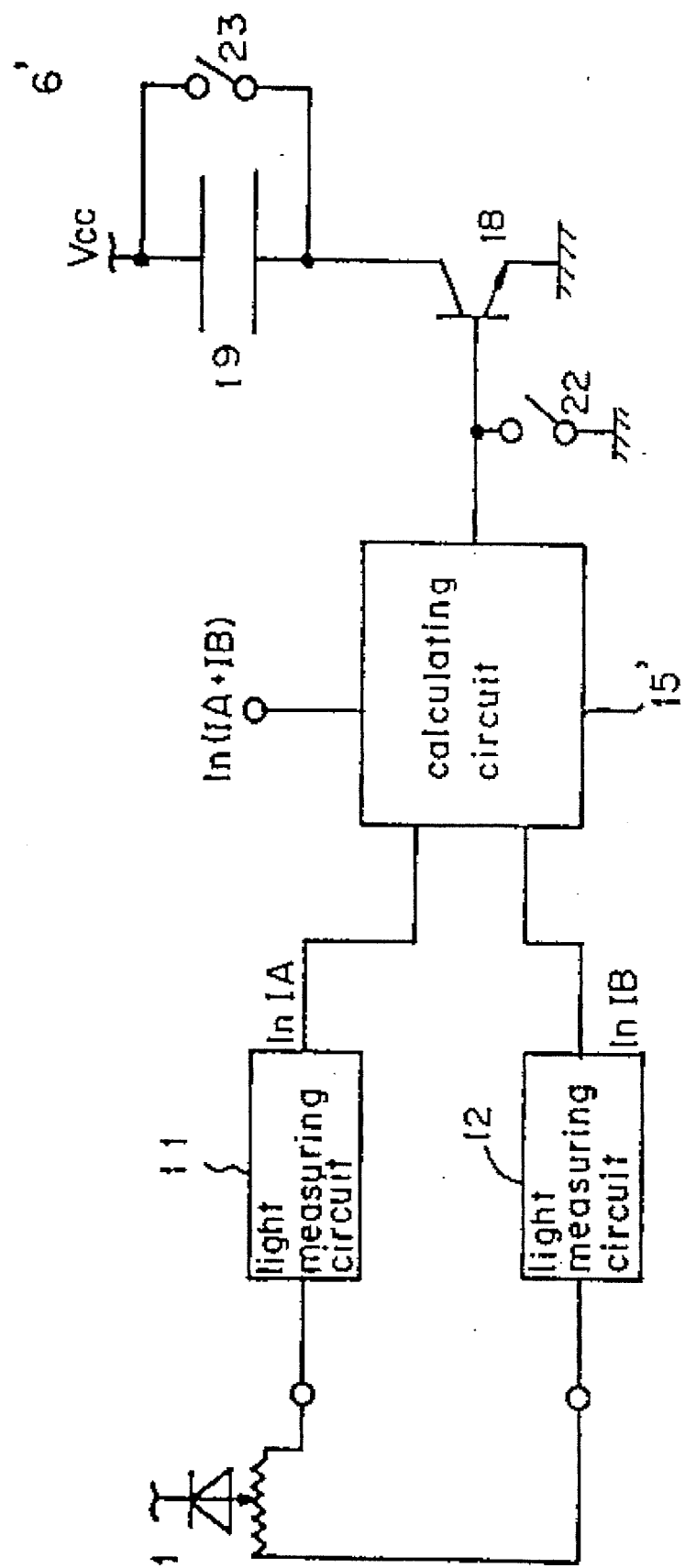
FIG. 13 is a block diagram of the distance measurement circuit of a second embodiment of the present invention.

FIG. 13 is a block diagram of a distance measuring circuit 6' according to a second embodiment of the present invention. The same components shown in FIG. 12 are given the same reference numbers in FIG. 13. The difference of the circuit of FIG. 13 from that of FIG. 12 is that the functions to extend and integrate the reflected light amount signals are eliminated. Instead, ln(IA+IB) output voltage is taken out of calculation circuit 15' and is output to microcomputer 8.

Figure 15:
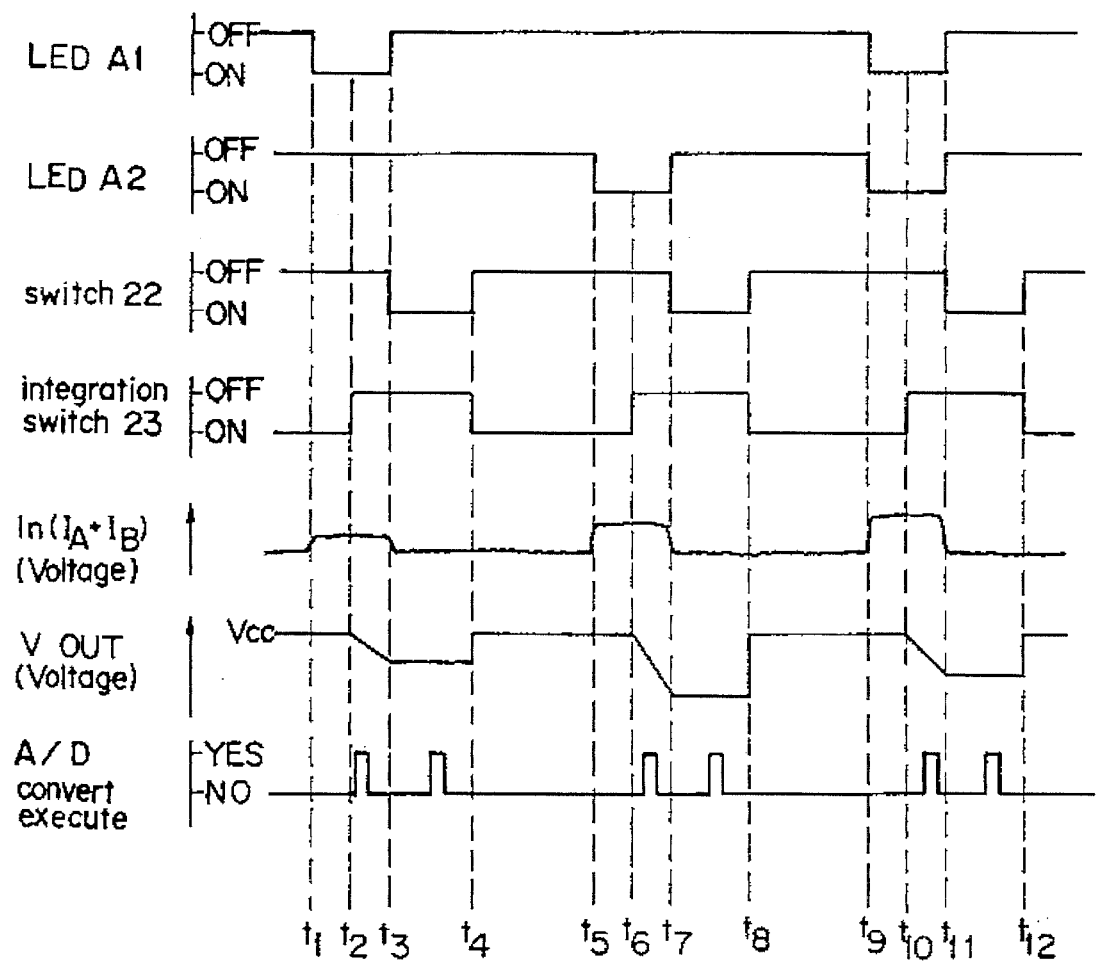
FIG. 15 is a timing chart of the operation of distance measurement with regard to the second embodiment of the present invention.

The operation of the second embodiment is explained with reference to FIG. 15. Because light emission control and integration control are the same as in the above-described operation shown in FIGS. 14 and 16, detailed explanations thereof are omitted. The difference from the first embodiment is that the A/D conversion of the reflected light amount signals is carried out during the light emission by the LED (periods between t2 and t3, t6 and t7 and t10 and t11 in FIG. 15). As shown in FIG. 13, because ln(IA+IB) is taken out of the reflected light amount monitoring terminal, voltage corresponding to the reflected light amount is output only during the light emission. By doing this, the monitoring of the reflected light amount and the monitoring of the object distance signal can be performed in one session of light emission, and distance measurement can be made with half the number of light emission sessions present in the first embodiment (FIGS. 12, 14 and 16). Naturally, in the second embodiment as well, the sequence of running electric current to A1 only, A2 only and both A1 and A2 may be changed. Further, needless to say, light is emitted several times for each monitoring session so that S/N is increased via calculation of the average by microcomputer 8 to output more precise data.

As described above, by projecting multiple distance-measuring beams of light having different luminous intensity distributions toward a certain distance measurement point of the object at different times and by calculating the object distance based on the output from the light receiving means, the present invention obtains correct object distance information even if there is vignetting.

Although the present invention has been described in detail with reference to certain preferred embodiments, variations and modifications exist within the scope and spirit of the invention as described, and it should be understood that the invention is to be limited only insofar as is required by the scope of the following claims.

I claim:

1. A distance measuring device comprising:

a light projector which projects light toward an object to be measured;

a controller which controls said light projector to carry out a first light projection to emit a first light at a predetermined angle with a first light distribution and subsequently carry out a second light projection to emit a second light at the predetermined angle with a second light distribution which is different from the first light distribution;

a light receiver which receives the first and second light emitted by said light projector and reflected from the object and produces light reception signals; and a calculator which calculates a distance to the object by means of the light reception signals.

2. A distance measuring device as recited in claim 1, wherein said light receiver comprises a light reception surface and produces the light reception signal which represents a position of the incident light within the light reception surface.

3. A distance measuring device as recited in claim 1, wherein said light projector comprises two terminals and a light projection surface arranged between the terminals.

4. A distance measuring device as recited in claim 3, wherein said controller controls said light projector in such a manner that one of said terminals is activated first and the other of said terminals is activated second.

5. A distance measuring device as recited in claim 1, wherein said controller controls said light projector to carry out a third light projection to emit a third light at the predetermined angle with a third light distribution which is different from the first and the second light distributions.

6. A distance measuring device as recited in claim 5, wherein said light receiver receives the third light emitted by said light projector and reflected from the object and produces a third light reception signal.

7. A distance measuring device as recited in claim 6, wherein said calculator calculates a correction value by means of two of said light reception signals and corrects the rest of said light reception signals to obtain the object distance.

8. A distance measuring device comprising:

a light projector which projects light toward an object to be measured;

a controller which controls said light projector to carry out a plurality of light projections to emit light with different light distributions at the same predetermined angle;

a light receiver which receives the light emitted by said light projector and reflected from the object and produces light reception signals; and a calculator which calculates a distance to the object by means of the light reception signals.

9. A distance measuring device as recited in claim 8, wherein said light receiver comprises a light reception surface and produces the light reception signal which represents a position of the incident light within the light reception surface.

10. A distance measuring device as recited in claim 8, wherein said light projector comprises two terminals and a light projection surface arranged between the terminals.

11. A distance measuring device as recited in claim 10, wherein said controller controls said light projector in such a manner that said terminals are activated in order.

12. A distance measuring device comprising:

a light projector which comprises two terminals and a light projection surface arranged between the terminals;

a controller which activates said terminals in order to emit a plurality of light emissions having different light distributions from said light projection surface;

a light receiver which receives the plurality of light emissions emitted by said light projection surface and reflected from the object and produces a plurality of light reception signals; and a calculator which calculates a distance to the object by means of the plurality of light reception signals.

13. A distance measuring device as recited in claim 12, wherein said calculator calculates a correction value by means of two of said plurality of light reception signals and corrects the rest of said light reception signals to obtain the distance to the object.

14. A distance measuring device as recited in claim 13, wherein said light reception signals represent positions of incident light onto said light receiver.

15. A distance measuring device as recited in claim 14, wherein each of said light reception signals represents the center point of each of the received light emissions.

16. A distance measuring device as recited in claim 12, wherein said terminals are anodes.

17. A distance measuring device as recited in claim 12, wherein said terminals are cathodes.

* * * * *